(12) United States Patent
Safeldt

(10) Patent No.: US 11,254,013 B2
(45) Date of Patent: Feb. 22, 2022

(54) INTERCHANGEABLE ROBOT GRIPPER BASE

(71) Applicant: SoftBox Patents ApS, Hillerød (DK)

(72) Inventor: Uffe Safeldt, Hillerød (DK)

(73) Assignee: Softbox Patents ApS, Hillerød (DK)

( * ) Notice: Subject to any disclaimer, the term of this patent is extended or adjusted under 35 U.S.C. 154(b) by 124 days.

(21) Appl. No.: 16/755,499

(22) PCT Filed: Oct. 9, 2018

(86) PCT No.: PCT/DK2018/050252
§ 371 (c)(1),
(2) Date: Apr. 10, 2020

(87) PCT Pub. No.: WO2019/072348
PCT Pub. Date: Apr. 18, 2019

(65) Prior Publication Data
US 2021/0046657 A1    Feb. 18, 2021

(30) Foreign Application Priority Data

Oct. 11, 2017 (DK) .......................... PA 2017 70773
Jan. 29, 2018 (DK) .......................... PA 2018 70061

(51) Int. Cl.
*B25J 15/04* (2006.01)
*B25J 9/14* (2006.01)
*B25J 9/16* (2006.01)
*B25J 15/00* (2006.01)
*B25J 15/06* (2006.01)

(52) U.S. Cl.
CPC ............. *B25J 15/0441* (2013.01); *B25J 9/14* (2013.01); *B25J 9/161* (2013.01); *B25J 9/1674* (2013.01); *B25J 15/0019* (2013.01); *B25J 15/0061* (2013.01); *B25J 15/0625* (2013.01); *B25J 15/0658* (2013.01)

(58) Field of Classification Search
CPC ................ B25J 15/0441; B25J 15/0019; B25J 15/0061; B25J 15/0625; B25J 15/0658; B25J 15/04; B25J 9/14; B25J 9/161; B25J 9/1674; B25J 19/0029
See application file for complete search history.

(56) References Cited

U.S. PATENT DOCUMENTS 4,950,016 A * 8/1990 Kumar .................. B65G 47/91
294/64.2
5,168,622 A * 12/1992 Peyroux ............... B23Q 1/0009
29/709

(Continued)

*Primary Examiner* — Stephen A Vu
(74) *Attorney, Agent, or Firm* — Avek IP, LLC

(57) ABSTRACT

Systems and methods of a robotic arm coupling for connecting a tool with a robotic arm are disclosed. In an embodiment, the robotic arm coupling includes: a mounting interface for mounting the robotic arm coupling on a robotic arm; a coupler interface on which differently actuated tools are releasably and interchangeably coupled; a fluid inlet port connected to an external fluid source to receive a pneumatic fluid; a plurality of interface fluid ports; at least one valve in fluid a communication with the fluid inlet port and settable to at least a first and a second operating state; and a suction device configured to apply a fluid suction pressure to an interface fluid port when a fluid pressure is provided to the suction device.

10 Claims, 11 Drawing Sheets

(56) References Cited

U.S. PATENT DOCUMENTS

| | | | | |
|---|---|---|---|---|
| 6,012,222 | A * | 1/2000 | Asai | H05K 13/0409 |
| | | | | 29/832 |
| 6,401,543 | B1 * | 6/2002 | Raccio | G01L 19/0015 |
| | | | | 73/753 |
| 6,880,237 | B2 * | 4/2005 | Kosuge | B23P 19/043 |
| | | | | 269/156 |

* cited by examiner

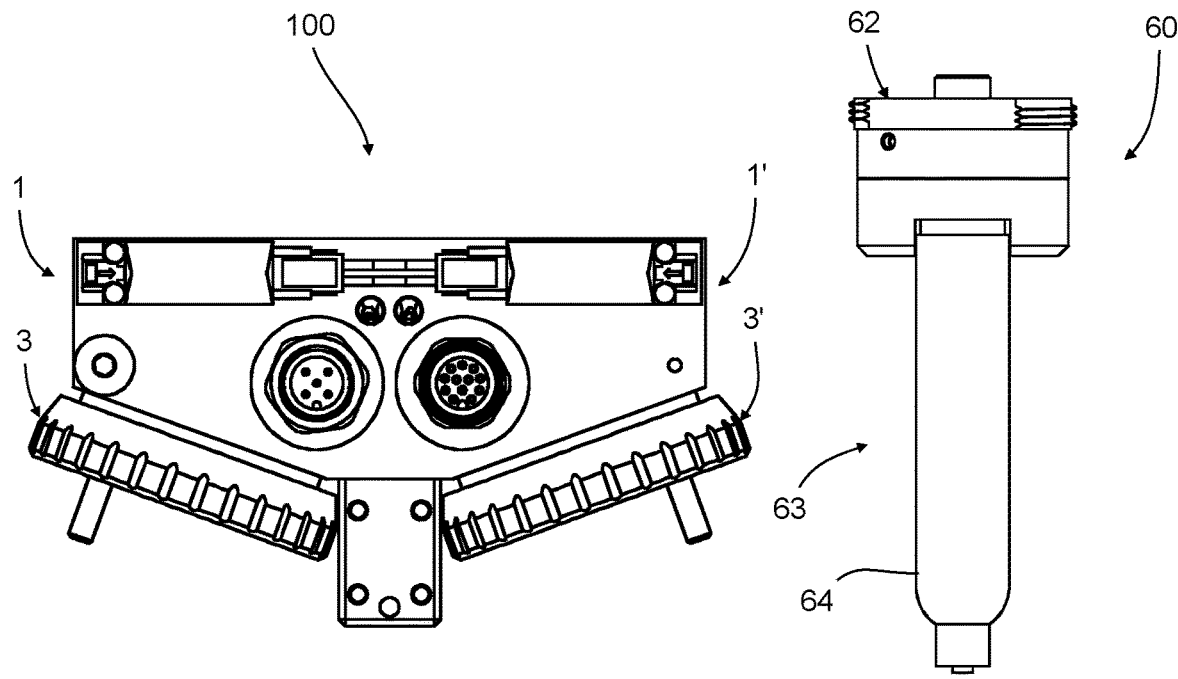
Fig. 3a
Fig. 3d
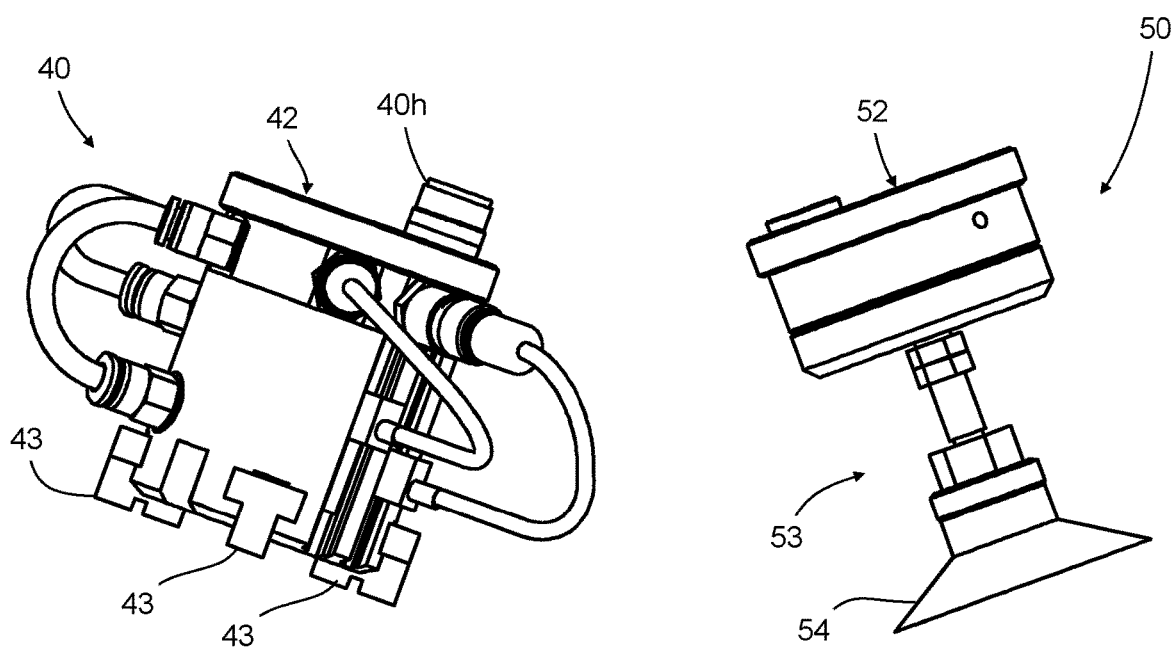
Fig. 3b
Fig. 3c

INTERCHANGEABLE ROBOT GRIPPER BASE

CROSS REFERENCE TO RELATED APPLICATIONS

This application is the United State national stage entry under 35 U.S.C. 371 of PCT/DK2018/050252 filed on Oct. 9, 2018, which claims priorities to Danish application number PA 2017 70773 filed on Oct. 11, 2017 and Danish application number PA 2018 70061 filed on Jan. 29, 2018, the disclosure of which are incorporated by reference herein in their entireties.

FIELD OF THE DISCLOSURE

The disclosure relates generally to robotic arm connections. More specifically, the disclosure relates to a robotic arm couplings for connecting a tool with a robotic arm.

BACKGROUND

In recent years, there has been a focus on developing small and versatile robotic arms that can switch between tasks easily. These robotic arms usually have a low weight which enables a single worker to move them between working stations and are simple enough to be programmed by low skilled workers. However, they also have a limited payload capacity. A typical application is to use a robotic arm in combination with a tool, for instance a gripping tool, for small scale manufacturing processes, such as simple object moving tasks (e.g. pick and place). The tool, such as a pneumatic gripper, is usually connected to the robotic arm by a coupling adapted specifically thereto. However, if another different tool is required, such as a suction gripper, then another different coupling is often added to the robotic arm. This increases the complexity of the coupling as more valves and components are required to accommodate and control the different tools increasing the weight and cost of the coupling. This also has negative implications as the weight of the coupling and tool is deducted from the lifting capacity of the robot and as such that maximum object-handling capacity is reduced.

In this disclosure, the term "valve" is understood to be a device which can be set to different operating states such as to allow, direct, or deny the passage of fluid through ports of the valve. Multiple valves may be included in a valve arrangement, such as a valve arrangement with three operating states and two individual valves. Multiple valves may be arranged in in series, in parallel, or in another flow path to form a valve arrangement which are still regarded as individual valves.

In this disclosure, the term "operating state" relates to a state in which the fluid connection or direction through a valve is changed, the term is not to be understood as a mere gradual change in flow velocity or flow pressure. In the case of multiple valves, an operating state of multiple valves refer to a setting of each valve, the setting of each valve, in an operating state, may be the same setting or a different setting. For example, in the case of two valves, each with an activated setting and a non-activated setting, a first operating state may refer to the first valve in the activated setting and the second valve in the non-activated setting and a second operating state of the valves may refer to both valves in the activated operating setting.

In this disclosure, the term "tool" is understood as a type of tool which is differentiated by the actuation thereof. For example, a large pneumatic gripping tool in this disclosure is regarded as the same type as a small pneumatic gripping tool if the tools are actuated in the same way and as such simply scaling a tool does not imply a different gripping tool. The tools are regarded as different types if, for instance, the large gripper requires a different layout of flow conduits compared to the small pneumatic gripper to be actuated. An example of two different gripping tools is a pneumatic actuated gripper and a suction-actuated gripper. The suction-actuated gripper may require a low pressure and a high-pressure source to respectively grip and release an object while the pneumatic gripper requires two different high-pressure sources to grip and release an object.

In this disclosure, the term "fluid connection" between two elements is understood as that when fluid is provided at one element, fluid will exit at the other element. The term does not necessarily imply that the same fluid entering at one element will exit at the other element. For instance, a pneumatic actuated gripper may include an actuation cylinder with a piston with two ports each disposed on a different side of the piston, such that when pneumatic fluid is provided at a first port, the piston moves and pushes pneumatic fluid out the other port. In this case, the ports of the cylinder are still regarded as being in fluid connection.

Suction pressure, underpressure, or low pressure is defined as a pressure smaller than an ambient pressure outside the robotic arm coupling, optionally the ambient pressure between a suction actuated gripper and an item to be gripped. Similarly, pneumatic pressure, overpressure, high pressure, or simply pressure is defined as a pressure higher than an ambient pressure outside the robotic arm coupling, optionally the ambient pressure between a suction actuated gripper and an item to be gripped.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a robotic arm coupling for connecting a tool with a robotic arm. The robotic arm coupling includes the following components.

A mounting interface for mounting the robotic arm coupling on a robotic arm.

A coupler interface configured to releasably and interchangeably couple differently actuated tools.

A fluid inlet port connected to an external fluid source to receive a pneumatic fluid.

A first fluid port provided with the coupler interface.
A second fluid port provided with the coupler interface.
A third fluid port provided with the coupler interface.
A fourth fluid port provided with the coupler interface.

At least one valve in fluid communication with the fluid inlet port and configured to be set to a first operating state and a second operating state. In the first operating state, the at least one valve allows a fluid communication between the fluid inlet port and the first fluid port. In the second operating state, the at least one valve allows a fluid communication between the fluid inlet port and the second fluid port.

A suction device configured to apply a fluid suction pressure to the third fluid port when a fluid pressure is provided to the suction device via the fourth fluid port. A first tool is configured to mount on the coupler interface to establish a fluid connection between the first fluid port and the second fluid port to actuate a pneumatically actuated gripper of the first tool, where the first operating state provides a gripping actuation of the pneumatically actuated gripper and the second operating state provides a release actuation of the pneumatically actuated gripper. A second tool is configured to mount on the coupler interface to establish a fluid connection between the second fluid port, the third fluid port, and a suction-actuated gripper of the second tool, and further establish a fluid connection between the first fluid port and the fourth fluid port, where the first operating state provides a suction actuation of the suction-actuated gripper and the second operating state provides a release actuation of the suction-actuated gripper. A third tool is configured to mount on the coupler interface to establish a fluid connection between the second fluid port and a dispensing actuator of the third tool, where the second operating state provides a dispensing actuation of the dispensing actuator.

Optionally, the at least one valve includes a first valve and a second valve. The first valve allows a fluid communication between the fluid inlet port and the first fluid port in the first operating state, and allows fluid a communication between the first fluid port and a fluid outlet in the second operating state. The second valve does not allow a fluid communication between the fluid inlet port and the first fluid port in the first operating state, and does not allow a fluid communication between the fluid inlet port and the second fluid port in the second operating state.

Optionally, the robotic arm coupling includes a fifth fluid port. The second valve allows a fluid communication between the second fluid port and the fifth fluid port in the first operating state. The first tool is configured to mount on the coupler interface to establish a fluid connection between the fifth fluid port and a fluid outlet. The second tool is configured to mount on the coupler interface to block the fifth fluid port. The third tool is configured to mounted on the coupler interface to establish a fluid connection between the first fluid port and the fourth fluid port, and further establish a fluid connection between the third fluid port and the fifth fluid port, where the first operating state provides a suction actuation of the dispensing actuator to prevent dispensing a liquid and the second operating state provides dispensing actuation of the dispensing actuator.

Optionally, the robotic arm coupling includes an electronic interface connected to a controller for setting the valve between the operating states. The electronic interface is connected to the at least one valve and has an input configured to receive a gripping actuation signal and a releasing actuation signal from a robotic arm, and further configured to transmit the gripping actuation signal and the releasing actuation signal to the controller. When a robotic arm is connected to the electronic interface and when a first, a second, or a third tool is mounted on the coupler interface, the input is configured to receive the actuation signal from the robotic arm and transmit it to the controller configured to set the operating states of the at least one valve to provide the gripping actuation of the pneumatically actuated gripper of the first tool, the gripping actuation of the suction-actuated gripper of the second tool, or the dispensing actuation of the dispensing actuator of the third tool upon receiving the gripping actuation signal, and the input is further configured to set the operating states of the at least one valve to provide the releasing actuation of the pneumatically actuated gripper of the first tool, the releasing actuation of the suction-actuated gripper of the second tool, or the suction actuation of the dispensing actuator of the third tool upon receiving the releasing actuation signal.

Optionally, the electronic interface includes an output. The controller includes a status detection device configured to provide a first actuation status signal such as a successful actuation status signal and a second actuation status signal such as a failed actuation status signal to the output. When a robotic arm is connected to the electronic interface and when a first, a second, or a third tool is mounted on the coupler interface and has performed an actuation, the status detection device is configured to detect if the actuation has succeeded or failed. If succeeded, the status detection device provides a first actuation status signal. If failed, the status detection device provides a second different actuation status signal.

Optionally, the status detection device includes a pressure sensor configured to detect a fluid suction pressure of the suction device by being in fluid communication with the third fluid port.

Optionally, the at least one valve includes a first valve and a second valve each having three valve ports: a pressure valve port, a utilization vale port, and an outlet valve port. The pressure valve port is in a fluid communication with the fluid inlet port. The suction device has a suction port, a pressure port, and an outlet port. The suction device applies a fluid suction pressure via the suction port to the third fluid port, and a fluid flow through the outlet port when a fluid pressure is provided to the suction device through the pressure port via the fourth fluid port. The first valve allows a fluid communication between the pressure valve port and the utilization valve port, and the second valve allows fluid communication between the utilization valve port and the outlet valve port in the first operating state. The first valve allows a fluid communication between the utilization valve port and the outlet valve port, and the second valve allows a fluid communication between the pressure valve port and the utilization valve port in the second operating state.

Optionally, the at least one valve is configured to be set to a third operating state. The at least one valve shuts all fluid communications between the fluid inlet port and the first fluid port, the second fluid port, the third fluid port, and the fourth fluid port.

In other embodiments, the disclosure provides a robotic arm system. The robotic arm system includes a robotic arm coupling and a tool selected from the group consisting of a first tool, a second tool, and a third tool. The first tool is configured to mount on the robotic arm coupling to establish a fluid connection between the first fluid port and second fluid port to actuate a pneumatically actuated gripper of the first tool. The second tool is configured to mount on the robotic arm coupling to establish a fluid connection between the second fluid port, the third fluid port, and a suction-actuated gripper of the second tool, and further establish a fluid connection between the first fluid port and the fourth fluid port. The third tool is configured to mount on the robotic arm coupling to establish a fluid connection between the second fluid port and a dispensing actuator of the second tool.

In further embodiments, the disclosure provides a method of connecting a tool to a robotic arm coupling. The method includes the following steps: (1) providing a robotic arm coupling; and (2) connecting any one of a first, second, and a third tool to the robotic arm coupling through the coupler interface of the robotic arm coupling, so that the respective tool is controllable by the at least one valve of the robotic arm coupling.

BRIEF DESCRIPTION OF THE DRAWINGS

Illustrative embodiments of the present disclosure are described in detail below with reference to the attached drawing figures.

FIG. 1b is an orthographic top view of the base of FIG. 1a.

FIG. 3a is an orthographic side view of the base of FIG. 1a.

FIG. 3b is an orthographic side view of a first tool according to an embodiment of the disclosure.

FIG. 3c is an orthographic side view of a second tool according to an embodiment of the disclosure.

FIG. 3d is an orthographic side view of a third tool according to an embodiment of the disclosure.

DETAILED DESCRIPTION

Figure 1A:
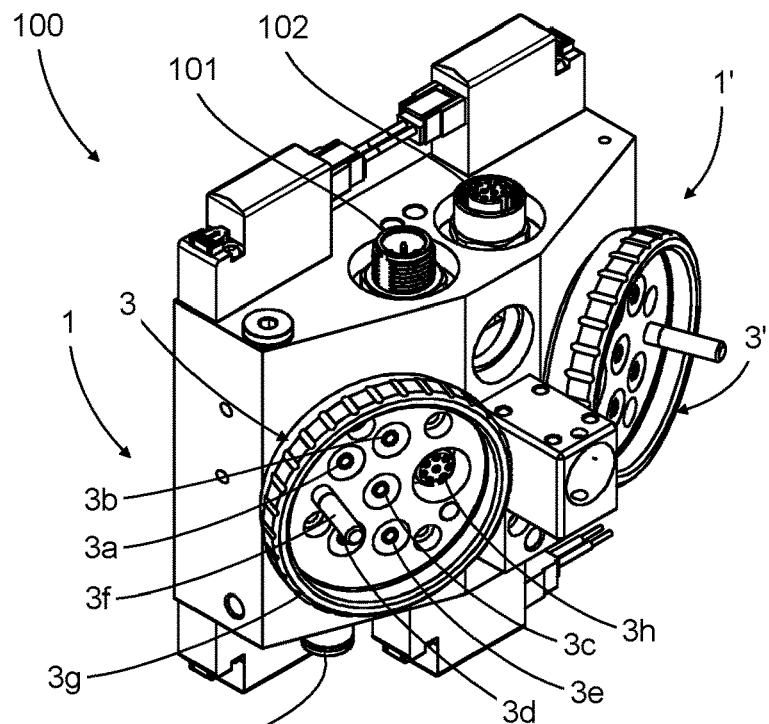
FIG. 1a is a perspective view of a base according to an embodiment of the disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

As shown in FIGS. 1a-11, 1 and 1' represent two robotic arm couplings, 2 and 2' represent a mounting interface, 3 and 3' represent a coupler interface, 3a represents a first interface fluid port, 3b represents a second interface fluid port, 3c represents a third interface fluid port, 3d represents a fourth interface fluid port, 3e represents a fifth interface fluid port, 3f represents an alignment device, 3g represents a union nut, 3h represents an electrical connector, 4 represents a fluid inlet port, 5 represents a status detection device, 6a represents a first fluid outlet port, 6b represents a second fluid outlet port, 10 represents a first valve, 10a represents a pressure valve port, 10b represents a utilization valve port, 10c represents an outlet valve port, 10d represents a second utilization valve port, 11 represents a first operating state, 12 represents a second operating state, 20 represents a second valve, 20a represents a pressure valve port, 20b represents a utilization valve port, 20c represents an outlet valve port, 21 represents a first operating state, 22 represents a second operating state, 30 represents a suction device, 30a represents a suction port, 30b represents a pressure port, 30c represents an outlet port, 40 represents a first tool, 40a represents a first tool interface fluid port, 40b represents a second tool interface fluid port, 40c represents a third tool interface fluid port, 40d represents a fourth tool interface fluid port, 40e represents a fifth tool interface fluid port, 40h represents an electrical connection, 42 represents a first tool interface, 43 represents a pneumatically actuated gripper, 44 represents a gripping arm mount, 45 represents a first cylinder port, 46 represents a second cylinder port, 47 represents a contracting actuation, 48 represents an expanding actuation, 49 represents a fluid outlet port, 50 represents a second tool, 50a represents a first tool interface fluid port, 50b represents a second tool interface fluid port, 50c represents a third tool interface fluid port, 50d represents a fourth tool interface fluid port, 50e represents a fifth tool interface fluid port, 52 represents a second tool interface, 53s represents a suction-actuated gripper, 54 represents a suction cup, 60 represents a third tool, 60a represents a first tool interface fluid port, 60b represents a second tool interface fluid port, 60c represents a third tool interface fluid port, 60d represents a fourth tool interface fluid port, 60e represents a fifth tool interface fluid port, 62 represents a third tool interface, 63 represents a dispensing actuator, 64 represents a dispenser, 100 represents a base, 101 represents an electrical connection, 102 represents an electrical connection, and 200 represents an object.

FIG. 1a shows a base 100 with two robotic arm couplings 1 and 1'. The robotic arm couplings 1 and 1' may each include a coupler interface 3 and 3'. The base may have a fluid inlet port 4 for receiving pneumatic fluid (e.g., pressurized air) from an external fluid source, and which may transmit the pneumatic fluid to each of the robotic arm couplings 1 and 1'. Each coupler interface 3 and 3' may include (only shown on one coupler interface) five interface fluid ports, an alignment device 3f in the form of a pin, a union nut 3g, and electrical control connections 3h. The five interface fluid ports may be provided in association with the coupler interface 3 and 3'. The union nut 3g may be used to mount a tool to the coupling interface 3. The base 100 may further include two electrical connections 101 and 102 for electrically connecting the base to a robotic arm. The electrical connections 101 and 102 may allow the robotic arm coupling to receive actuation signals from a connected robotic arm and transmit an actuation status signal to a connected robotic arm. The pin 3f may also provide stability when connecting a tool. The alignment device 3f and the electrical connector 3h may position the mounted tool correctly in the coupler interface 3.

Figure 1B:
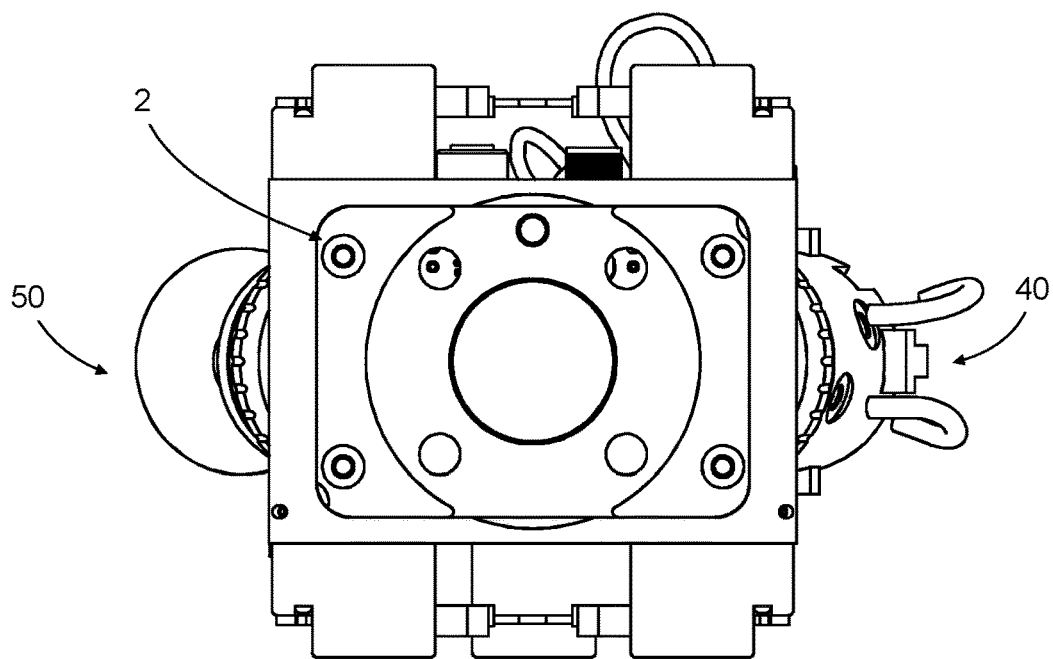

FIG. 1b shows the base 100 of FIG. 1a. As shown in FIG. 1b, a first tool 40 and a second tool 50 may be mounted on the two robotic arm couplings 2 and 2'. The first tool 40 may be in the form of a pneumatic gripping tool and the second tool 50 may be in the form of a suction gripping tool. The base 100 may include a mounting interface 2, which in this case may include a mounting plate and bolts, for mounting the base on a robotic arm (not shown).

Figure 2A:
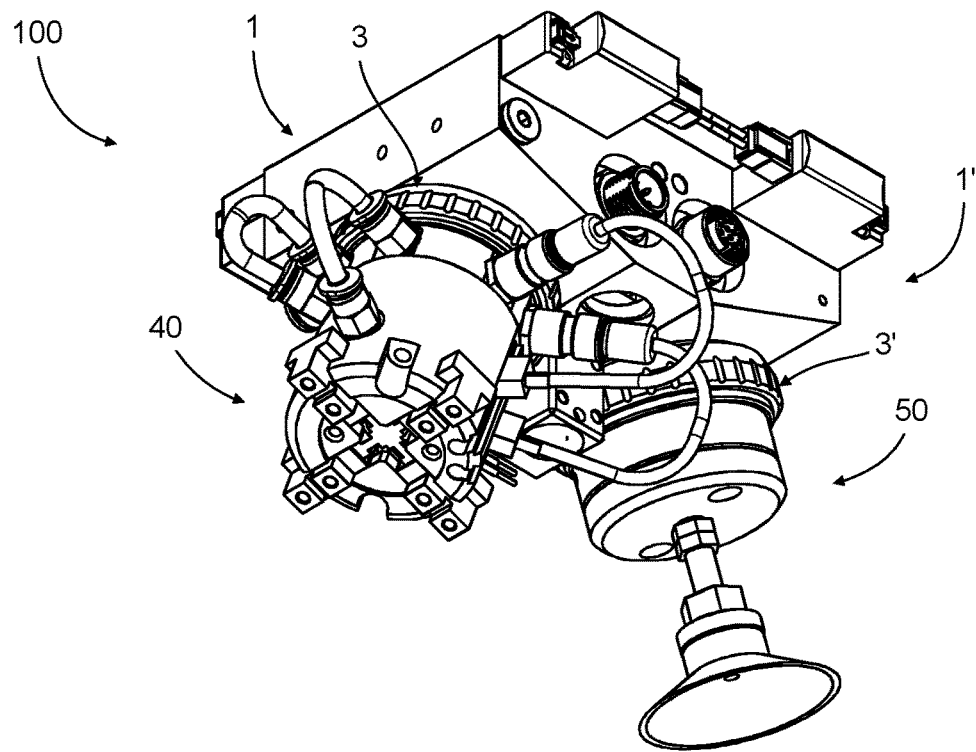
FIG. 2a shows the base of FIG. 1a with a mounted first tool and a mounted second tool.

FIG. 2a shows the base shown in FIG. 1a with a first 40 and a second tool 50 each respectively mounted on a robotic arm coupling 1 and 1' of the base 100 by the coupler interface 3 and 3' of each robotic arm coupling 1 and 1'.

Figure 2B:
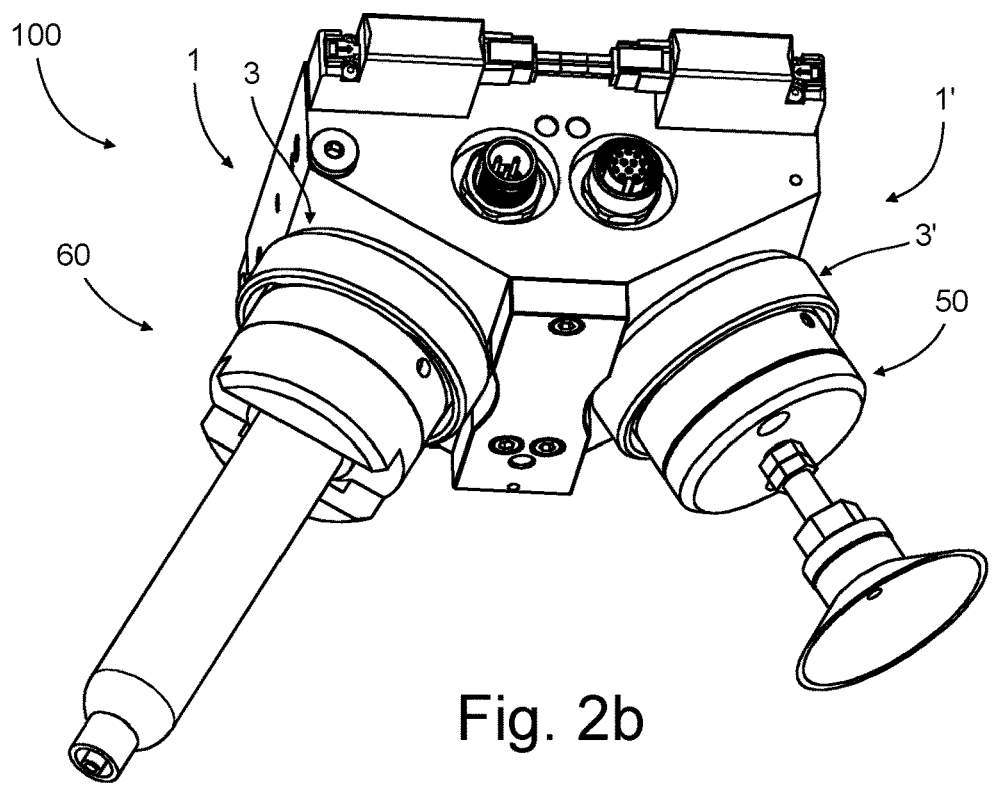
FIG. 2b shows the base of FIG. 1a with a mounted second tool and a mounted third tool.

FIG. 2b shows the base 100 shown in FIG. 1a with a second 50 and a third tool 60 each respectively mounted on a robotic arm coupling 1 and 1' of the base 100 by the coupler interface 3 and 3' of each robotic arm coupling 1 and 1'. The second tool 50 may be in the form of a suction gripping tool and the third tool may be in the form of a liquid dispensing tool.

FIG. 3a shows a base 100 having two robotic arm couplings 1 and 1' without any mounted tools. A first 40 and second tool 50 may be connected to any of the robotic arm couplings 1 and 1' through the coupler interface 3 and 3' of the robotic arm coupling 1 and 1' by fastening the union nut 3f such that any one of the first 40 and the second tool 50 may controllable by the at least one valve (not shown) of the robotic arm coupling 1.

FIG. 3b shows a first tool 40 in the form of a pneumatic gripping tool with a pneumatically actuated gripper 43 which in this case may have four gripping arm holders 43; however, it may be any other number, which may accommodate gripping arms (not shown). The pneumatically actuated gripper 43 may grip objects by contracting a set of gripping arms (not shown) to hold around an object (not shown), or it may expand the set of gripping arms (not shown) inside an object having a cavity to thereby grip the object. The first tool 40 may release the gripped object by reversing the above action. The tool 40 may have an electrical connector 40h for connecting with an electronic interface (not shown) of the robotic arm coupling 1. The electrical connector 40h may also allow the controller to detect if a mounted tool is a first tool 40 or a second tool 50 by detecting the presence of the electrical connector 40h.

FIG. 3c shows a second tool 50 in the form of a suction gripping tool which may include a suction-actuated gripper 53 with a suction cup 54. The suction-actuated gripper 53 may grip objects (not shown) by abutting the object with the suction cup 54 and applying a suction pressure in a central port (not shown) of the suction cup 54 of the suction actuated gripper 53. The second tool 50 may release the gripped object either by waiting until the suction pressure rises if a leak is present or by applying pressure through the central port.

FIG. 3d shows a third tool 60 in the form of a dispensing tool which may include a dispensing actuator 63 with a dispenser 64. The dispensing actuator 53 may dispense a liquid on an object (not shown) contained in the dispensing tool by applying a pneumatic pressure to a piston (not shown) to dispense the liquid contained therein. The third tool 60 may stop the dispensing actuation either by removing the pneumatic pressure and thus potentially allow some leakage of liquid or by applying a suction pressure to the piston to prevent further dispensing and leaking.

Figure 4:
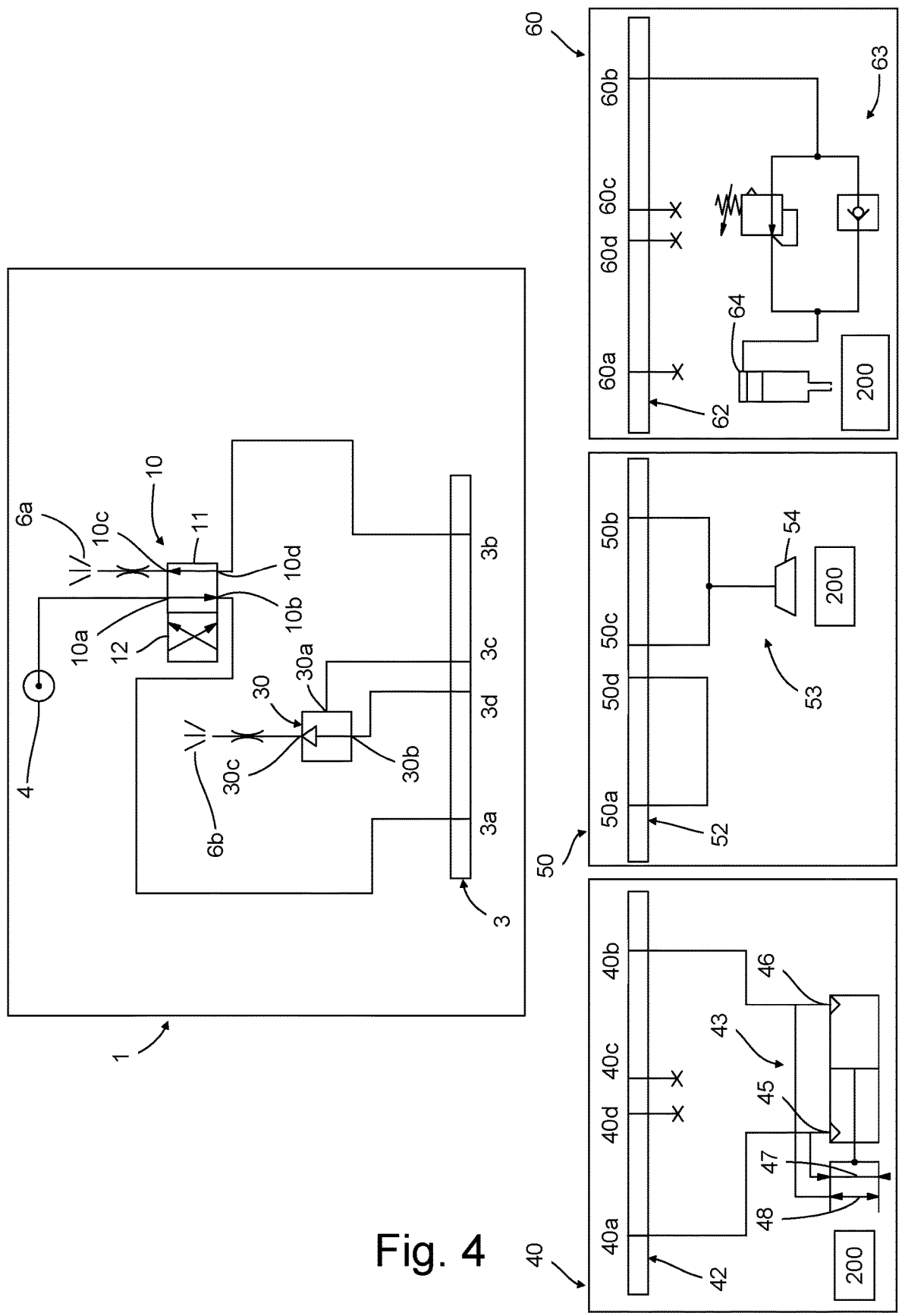
FIG. 4 is a pneumatic diagram of a robotic arm coupling according to an embodiment of the disclosure and of a suitable first, second, and third tool.

FIG. 4 shows an embodiment of a pneumatic diagram of a robotic arm coupling 1 for connecting a tool with a robotic arm. The robotic arm coupling may include: a mounting interface 2 for mounting the robotic arm coupling on a robotic arm; a coupler interface 3 on which the first 40, the second 50, and the third tool 60 may be releasably and interchangeably coupled; a fluid inlet port 4 connected to an external or separately provided fluid source (not shown) to receive a pneumatic fluid; a first 3a, a second 3b, a third 3c, and a fourth 3d interface fluid port provided in association with the coupler interface; a valve 10 in fluid communication with the fluid inlet port 4 and settable to a first 11 and a second operating state 12; and a suction device 30 for applying a fluid suction pressure to the third interface fluid port 3c when a fluid pressure is provided to the suction device 30 via the fourth interface fluid port 3d. The fluid exits the suction device 30 via an outlet port 30c. In the first operating state 11, the valve 10 may allow fluid communication between the fluid inlet port 4 and the first interface fluid port 3a via a pressure port 10a and a first utilization port 10b of the first valve 10, and between the second interface fluid port 3b and a fluid outlet via a second utilization port 10d and an outlet valve port 10c of the valve 10. In the second operating state 12, the valve 10 may allow fluid communication between the fluid inlet port 4 and the second interface fluid port 3b, and between the first interface fluid port 3a and the first fluid outlet port 6a via a second utilization port 10d and the outlet valve port 10c of the valve 10. A check valve (not shown) may suitably be placed between the outlet port 10c of the valve 10 and the first fluid outlet port 6a to ensure that pneumatic fluid does not bleed when applying suction pressure on interface port 3c with a mounted second tool 50.

FIG. 4 further shows a pneumatic diagram of a first tool 40 with a pneumatically actuated gripper 43, a second tool 50 with a suction-actuated gripper 53 including a suction cup 54, a third tool 60 with a dispensing actuator 63 having a pressure regulator, and a dispenser 64. The first 40, second tool 50, and the third tool 60 may have a first 42, a second tool interface 52, and a third tool interface 62, respectively, which may be coupled to the coupler interface 3 of the robotic arm coupling 1 and which may have a first 40a, 50a, 60a; a second 40b, 50b, 60b; a third 40c, 50c, 60c; and a fourth tool interface fluid port 40d, 50d, 60d corresponding to those of the robotic arm coupling 1. The first tool 40 may have a fluid connection between the first 40a and the second tool interface fluid port 40b to actuate the pneumatically actuated gripper 43 by providing pneumatic fluid to first cylinder port 45 and allowing pneumatic fluid to leave the cylinder from a second cylinder port 46 while the third 40c and the fourth tool interface fluid port 40d are blocked. The second tool 50 may have a fluid connection between the first 50a and the fourth tool interface fluid port 50d and a fluid connection between the second tool interface fluid port 50b, the third interface fluid port 50c, and a suction-actuated gripper 53 of the second tool to actuate the suction-actuated gripper 53. The third tool 60 may have a fluid connection between the second tool interface port 60d and the dispensing actuator 63 to provide a dispensing actuation of the dispensing actuator when a pneumatic pressure is applied to the second tool interface port 60d. The remaining tool interface ports 60a, 60c, 60d may be blocked.

When the first tool 40 is mounted on the coupler interface 3, the first tool 40 may establish a fluid connection between the first 3a and the second interface fluid port 3b via the fluid connection between the first and second tool interface fluid ports 40a and 40b to actuate the pneumatically actuated gripper 43 of the first tool 40. The first operating state may provide gripping actuation of the pneumatically actuated gripper 43 and the second operating state may provide a release actuation of the pneumatically actuated gripper 43.

When the second tool 50 is mounted on the coupler interface 3, the second tool 50 may establish a fluid connection between the second interface fluid port 3b, the third interface fluid port 3c, and a suction-actuated gripper 53 of the second tool, and a fluid connection between the first interface fluid port 3a and the fourth interface fluid port 3d, such that the first operating state may provide suction actuation of the suction-actuated gripper 53 and the second operating state may provide a release actuation of the suction-actuated gripper 53.

When the third tool 60 is mounted on the coupler interface 3, the third tool 60 may establish a fluid connection between the second interface fluid port 3b and the dispensing actuator while the remaining interface fluid ports 3a, 3c, 3d are blocked.

Figure 5:
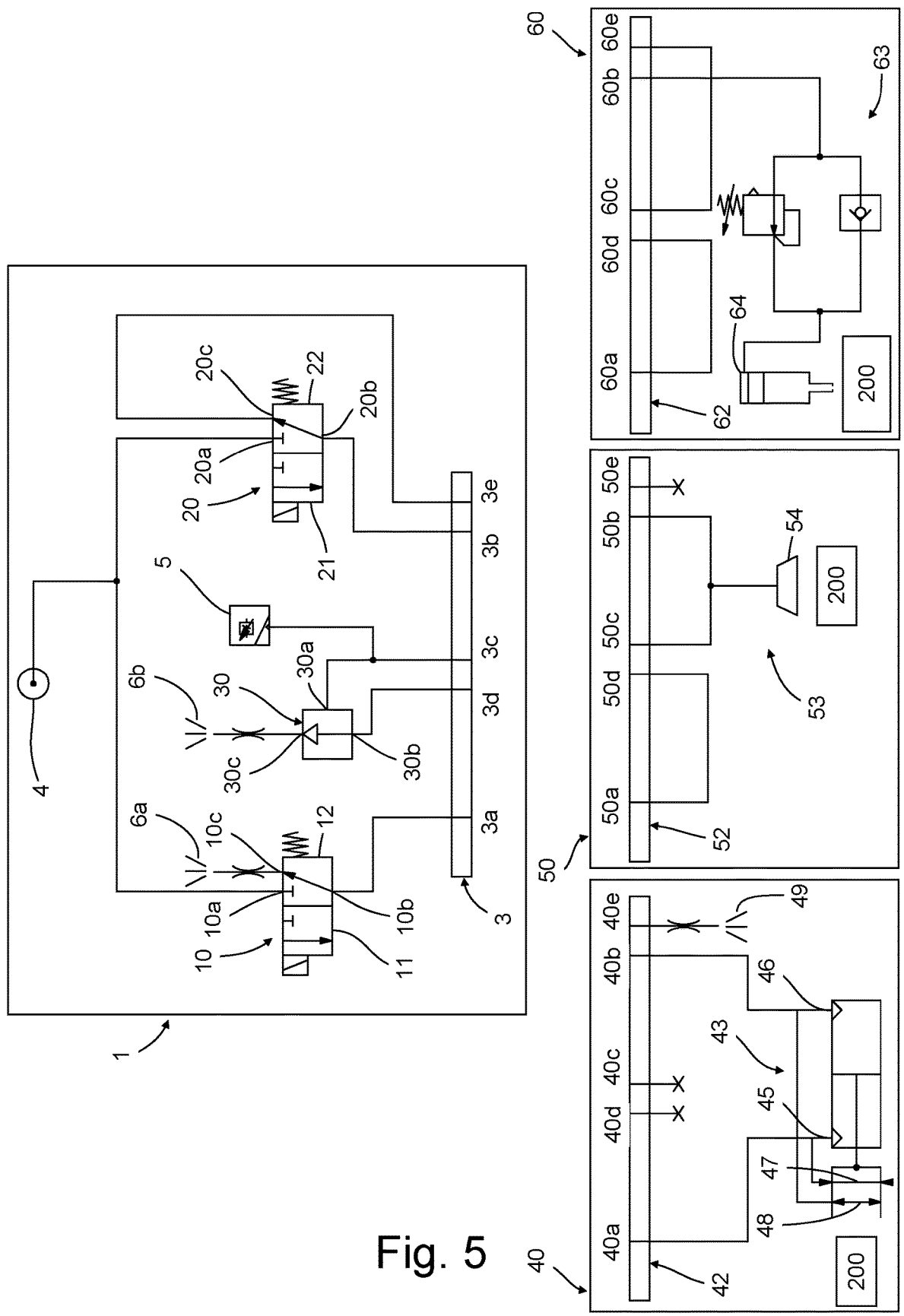
FIG. 5 is a pneumatic diagram of a robotic arm coupling according to another embodiment of the disclosure, and of a suitable first, second, and third tool.

FIG. 5 shows an embodiment of a pneumatic diagram of the invention similar to the embodiment shown in FIG. 4 except that the robotic arm coupling 1 may include two valves 10 and 20, an electronic interface (not shown), and a fifth interface fluid port 3e. The two valves 10 and 20 each has three valve ports: a pressure valve port 10a and 20a; a utilization valve port 10b and 20b; and an outlet valve port 10c and 20c. The two valves 10 and 20 may be set to three different operating states, and may be shown in the third operating state 12 and 22. The outlet valve port 10c of the first valve 10 may be connected to a first fluid outlet port 6a which may exhaust fluid outside the robotic arm coupling.

The first valve 10, in the first operating state 11, may allow fluid communication between the fluid inlet port 4 and the first interface fluid port 3a, and in the second operating state 12, may allow fluid communication between the first interface fluid port 3a and a first fluid outlet 6a, and in the third operating state 12, may block fluid communication between the fluid inlet port 4 and any of the interface fluid ports.

The second valve 20, in the first operating state 22, may allow fluid communication between the second interface fluid port 3b and the fifth interface fluid port 3e, in the second operating state 21, may allow fluid communication between the fluid inlet port 4 and the second interface fluid port 3b, and in the third operating state 22, does not allow fluid communication between the fluid inlet port 4 and any of the interface fluid ports.

The electronic interface (not shown) may be connected to a controller which may set the valves 10 and 20 between the three different operating states 11 and 22; 12 and 21; and 12 and 22 by actuating a coil of each valve. The electronic interface may connect to a robotic arm and may be connected to the two valves 10 and 20. The electronic interface may have an input (not shown) and an output (not shown). The input may transmit a first and a second actuation signal, for instance a gripping actuation signal and a releasing actuation signal, to the controller. The controller may include status detection device (not shown) which may include a pressure sensor 5 which may provide a first and a second actuation status signal, for instance a successful actuation status signal and a failed actuation status signal, and may transmit the actuation status signal to the output.

FIGS. 6 to 11 shows pneumatic diagrams for different fluid flow paths when an actuation is performed depending on the operating state of the valves and the mounted tool. Solid lines in the diagram show the fluid flow path of the pneumatic fluid and dashed lines shows where no or irrelevant amount of fluid is flowing compared to the solid lines.

Figure 6:
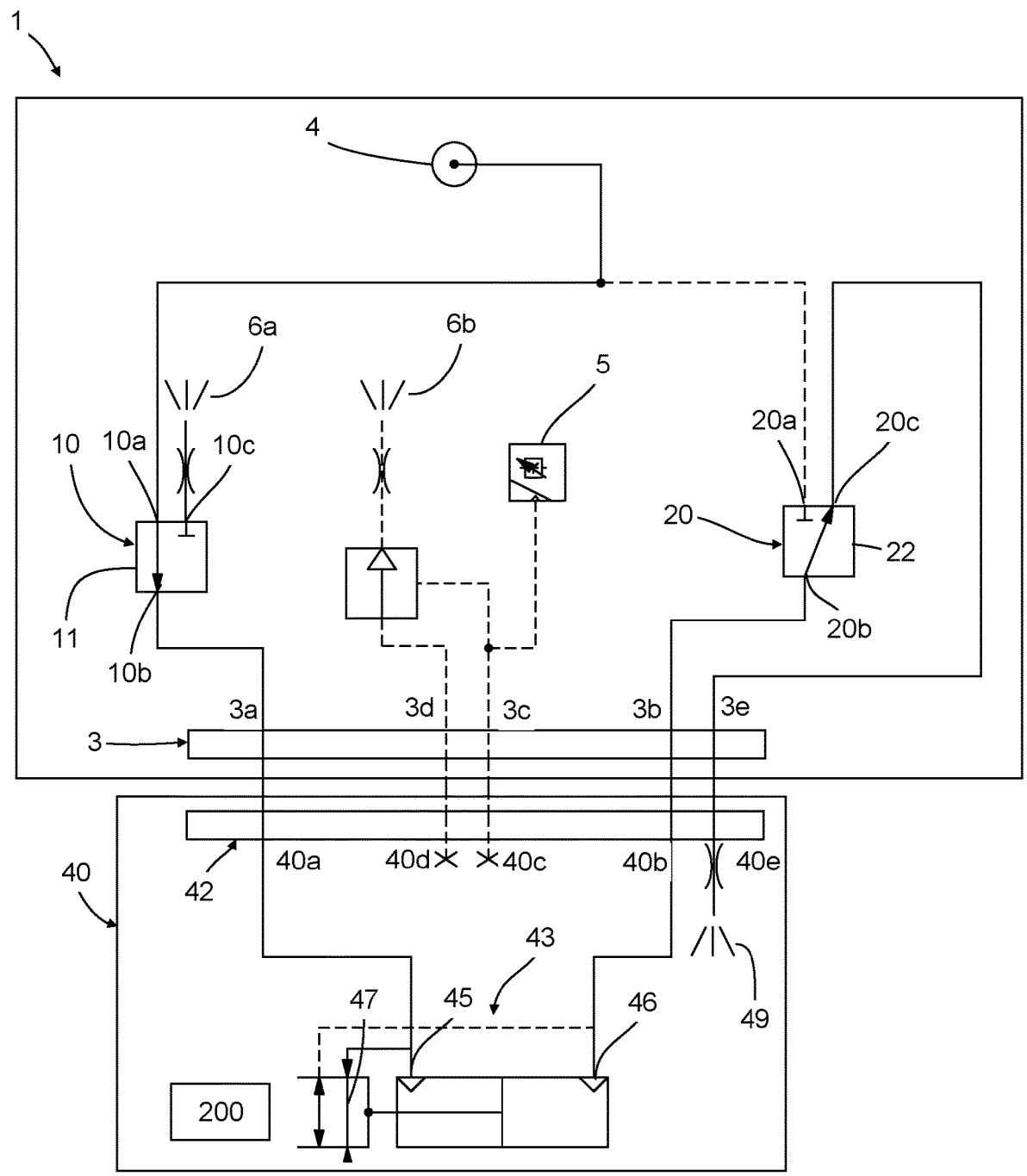
FIG. 6 is a pneumatic diagram of the robotic arm coupling of FIG. 5 with a mounted first tool in a first operating state.

FIG. 6 shows the pneumatic diagram of the robotic arm coupling 1 from FIG. 5 with a mounted first tool 40. The two valves 10 and 20 may be in the first operating state 11 and 22 to perform a contracting gripping actuation of a pneumatically actuated gripper 43 of the first tool. This may allow pneumatic fluid to flow from the fluid inlet port 4 to first interface fluid port 3a via the pressure valve port 10a and the utilization valve port 10b of the first valve 10. The pneumatic fluid flow may continue to a first cylinder port 45 of the pneumatically actuated gripper 43 via the first tool interface fluid port 40a to provide a contracting gripping actuation of the pneumatically actuated gripper 43 of the first tool 40. Pneumatic fluid may exit the first tool 40 through the second tool interface port 40b via a second cylinder port 46. The pneumatic fluid flow may be ejected by a first fluid outlet port 6a via the second interface port 3b, the utilization valve port 20b of the second valve 20, the outlet valve port 20c of the second valve, the fifth interface port 3e, and the fifth tool interface port 40e.

Figure 7:
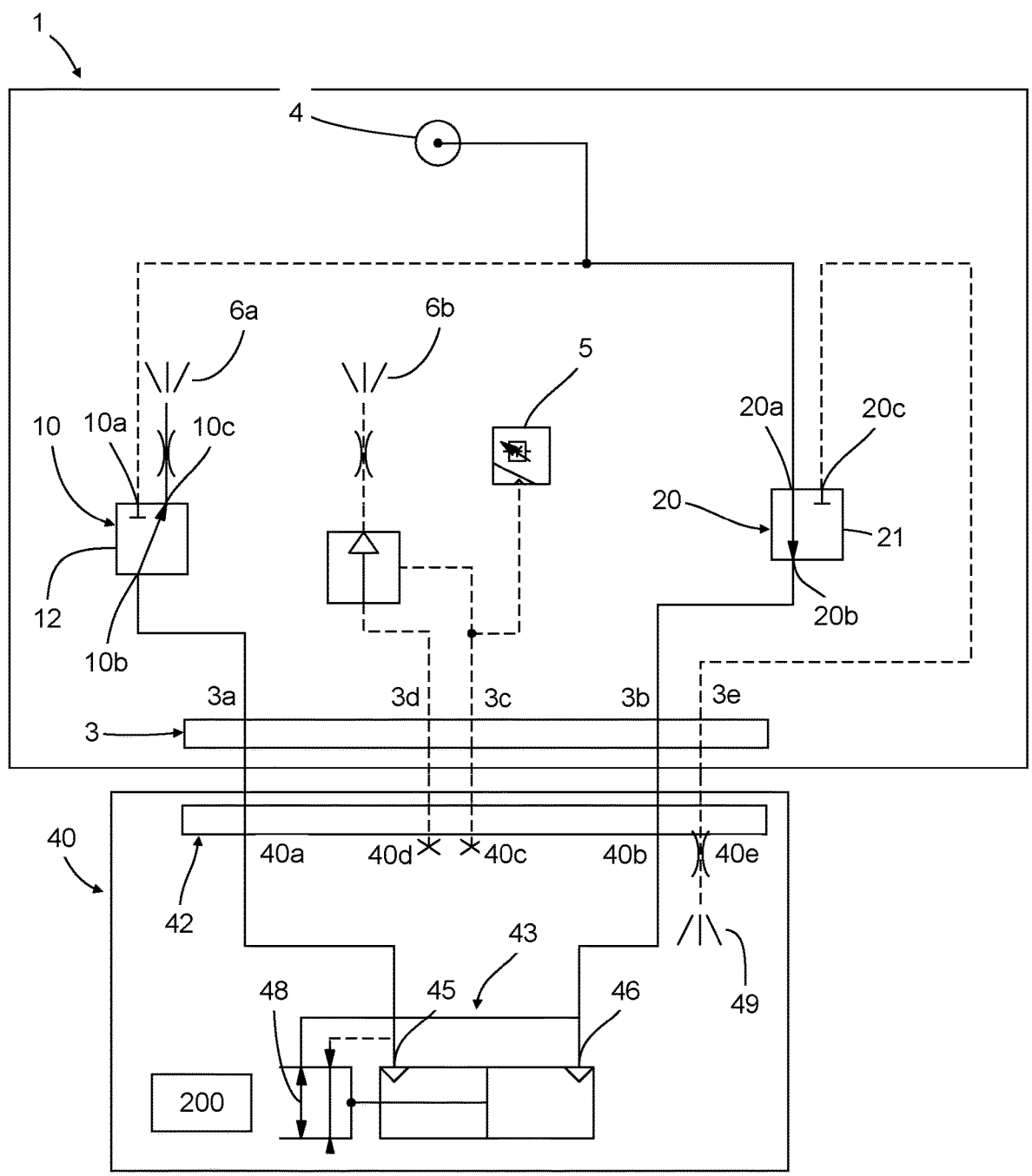
FIG. 7 is a pneumatic diagram of the robotic arm coupling of FIG. 5 with a mounted first tool in a second operating state.

FIG. 7 shows the pneumatic diagram of the robotic arm coupling 1 from FIG. 5 with a mounted first tool 40. The two valves 10 and 20 may be in the second operating state 12 and 21 to perform an expanding gripping actuation of a pneumatically actuated gripper 43 of the first tool. This may allow pneumatic fluid to flow from the fluid inlet port 4 to second interface fluid port 3b via the pressure valve port 20a and the utilization valve port 20b of the second valve 20. The pneumatic fluid flow may continue to a second cylinder port 46 of the pneumatically actuated gripper 43 via the second tool interface fluid port 40b to provide an expanding gripping actuation of the pneumatically actuated gripper 43 of the first tool 40. Pneumatic fluid may exit the pneumatically actuated gripper 43 through the first tool interface port 40a via the first cylinder port 45. The pneumatic fluid flow may be ejected by a fluid outlet port 49 of the first tool 40 via the first interface port 3a, the utilization valve port 10b of the first valve 10, and the outlet valve port 10c of the first valve 10. The first tool 40 may include an end travel sensor (not shown) which may detect the movement of the gripping arms both for the contracting gripping actuation and the expanding gripping actuation to provide an actuation status signal to the status detection device 5. The actuation status signal may either relate to the situation where the object has been successfully gripped or the situation where the object has been unsuccessfully gripped or lost.

Figure 8:
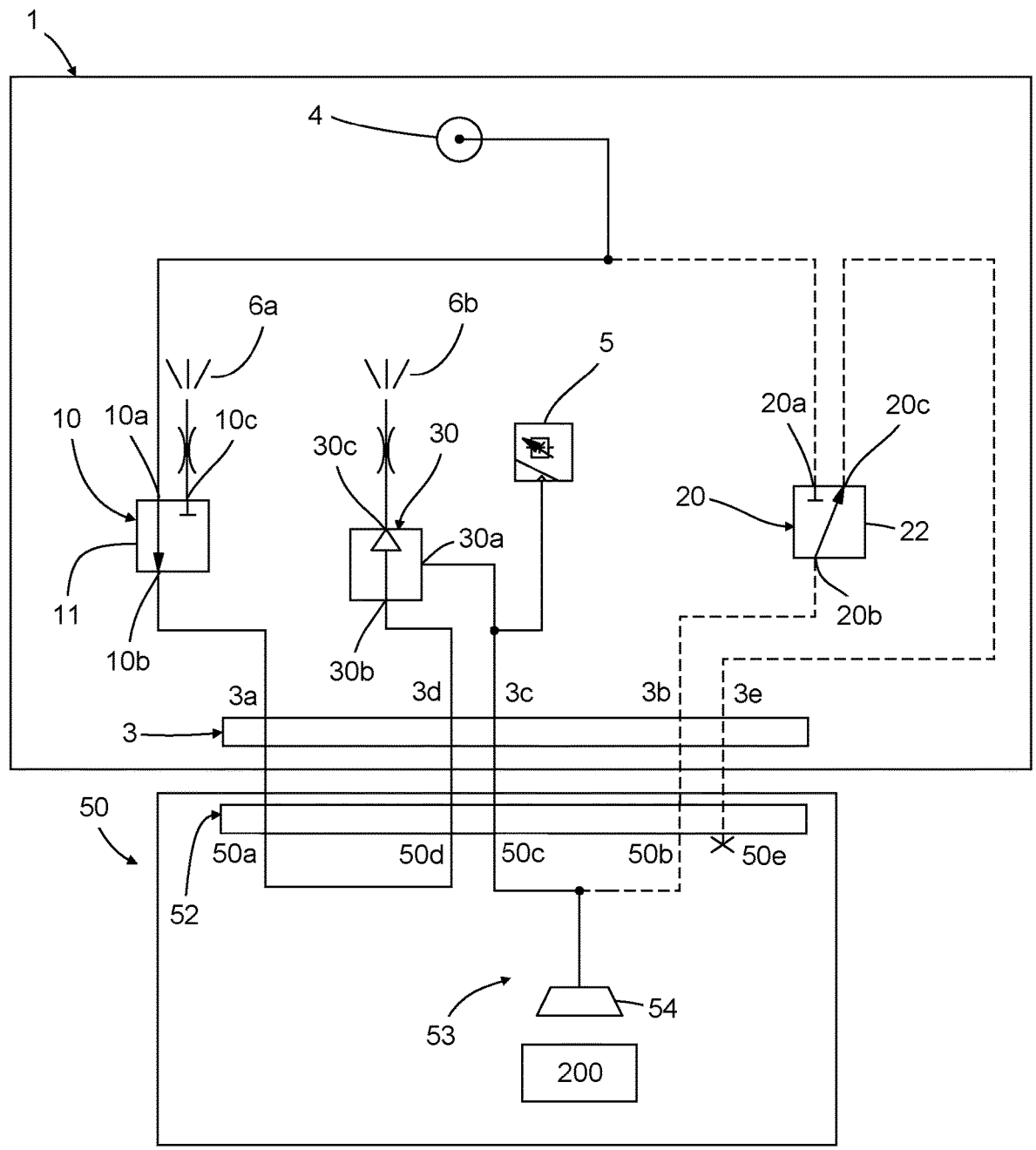
FIG. 8 is a pneumatic diagram of the robotic arm coupling of FIG. 5 with a mounted second tool in a first operating state.

FIG. 8 shows the pneumatic diagram of the robotic arm coupling 1 from FIG. 5 with a mounted second tool 50. The two valves 10 and 20 may be in the first operating state 11 and 22 to perform a suction actuation of a suction-actuated gripper 53 of the second tool 50 such that the second tool 50 grips an object 200. This may allow pneumatic fluid to flow from the fluid inlet port 4 to first interface fluid port 3a via the pressure valve port 10a and the utilization valve port 10b of the first valve 10. The pneumatic fluid flow may continue to the fourth interface fluid port 3d via the fluid connection between the first tool valve port 50a and the fourth tool valve port 50d in the second tool 50. The pneumatic fluid flow may enter the suction device, here in the form of a vacuum ejector, through the pressure port 30b of the suction device 30. The pneumatic fluid may be ejected through a second fluid outlet 6b via the outlet port 30c of the suction device 30. The suction device 30, by ejecting the pneumatic fluid, may create a suction pressure at the suction port 30a of the suction device 30. This suction pressure may draw fluid from a central port (not shown) in the suction cup 54 via the third tool interface fluid port 50c and the third interface fluid port 3c. The fluid connection through the second valve 20 may be blocked by a blockage at the fifth tool interface fluid port 50e. The blockage may be provided by simply blocking the fifth interface fluid port. The pressure sensor 5 may provide an actuation status signal, which is if the gripping actuation has been performed successfully, when a suction-actuated gripper 50 is mounted by detecting if the pressure from the third interface fluid port 3c which is in direct fluid communication with a central port inside a suction cup 54 of the suction-actuated gripper 50, is sustained below ambient pressure.

Figure 9:
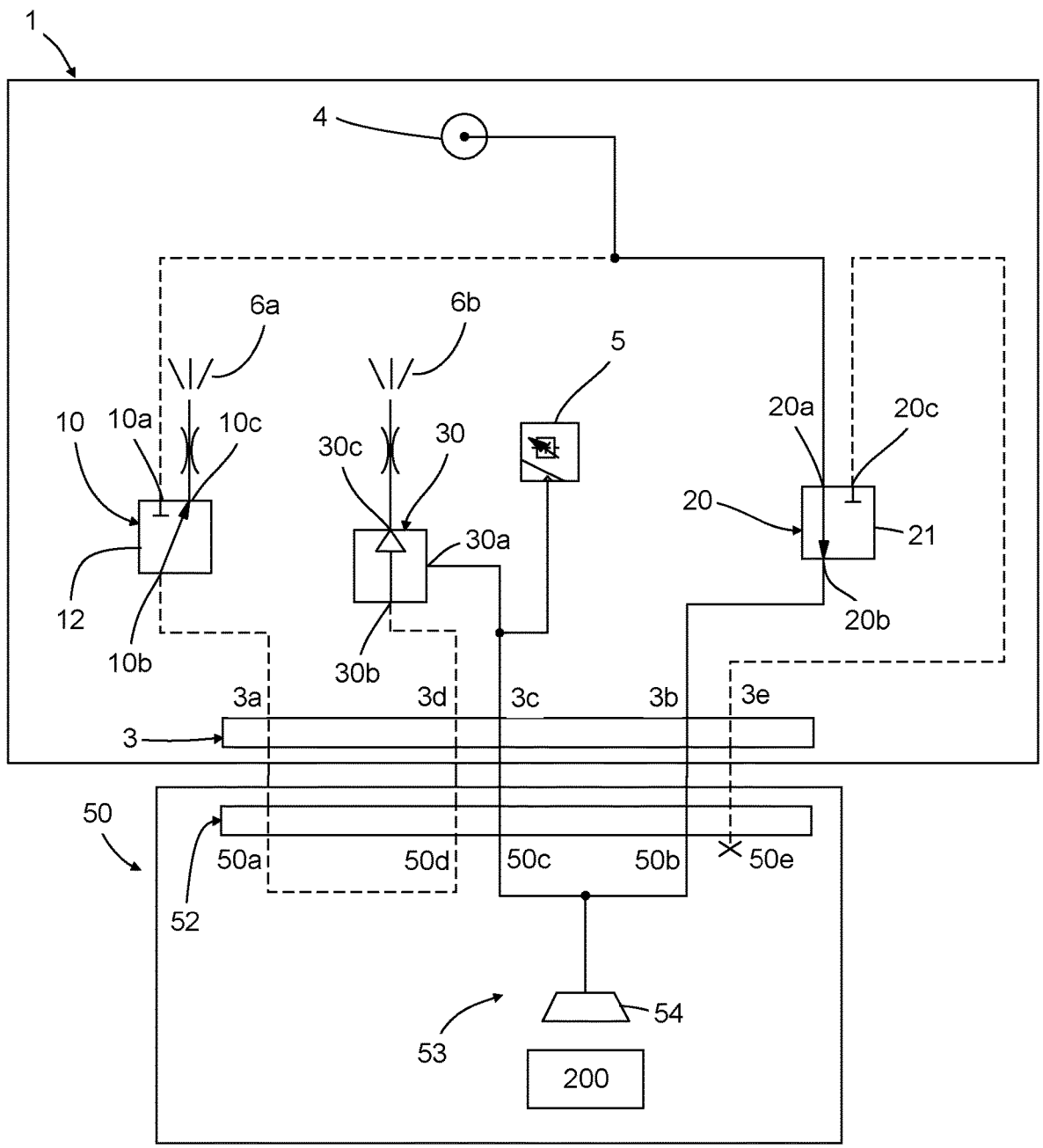
FIG. 9 is a pneumatic diagram of the robotic arm coupling of FIG. 5 with a mounted second tool in a second operating state.

FIG. 9 shows the pneumatic diagram of the robotic arm coupling 1 from FIG. 5 with a mounted second tool 50. The two valves 10 and 20 may be in the second operating state 12 and 21 to perform a releasing actuation of a suction-actuated gripper 53 of the second tool 50 such that the second tool 50 releases an object 200. This may allow pneumatic fluid to flow from the fluid inlet port 4 to second interface fluid port 3b via the pressure valve port 20a and the utilization valve port 20b of the second valve 20. The pneumatic fluid may continue through the second tool interface port 50b to eject out through a central port in the suction cup 54. The pressure sensor 5 may provide an actuation status signal, which is if the releasing actuation has been performed successfully, when a suction-actuated gripper 50 is mounted by detecting if the pressure from the third interface fluid port 3c, which is in direct fluid communication the central port inside the inside a suction cup 54 of the suction-actuated gripper 50, has risen to ambient pressure.

Figure 10:
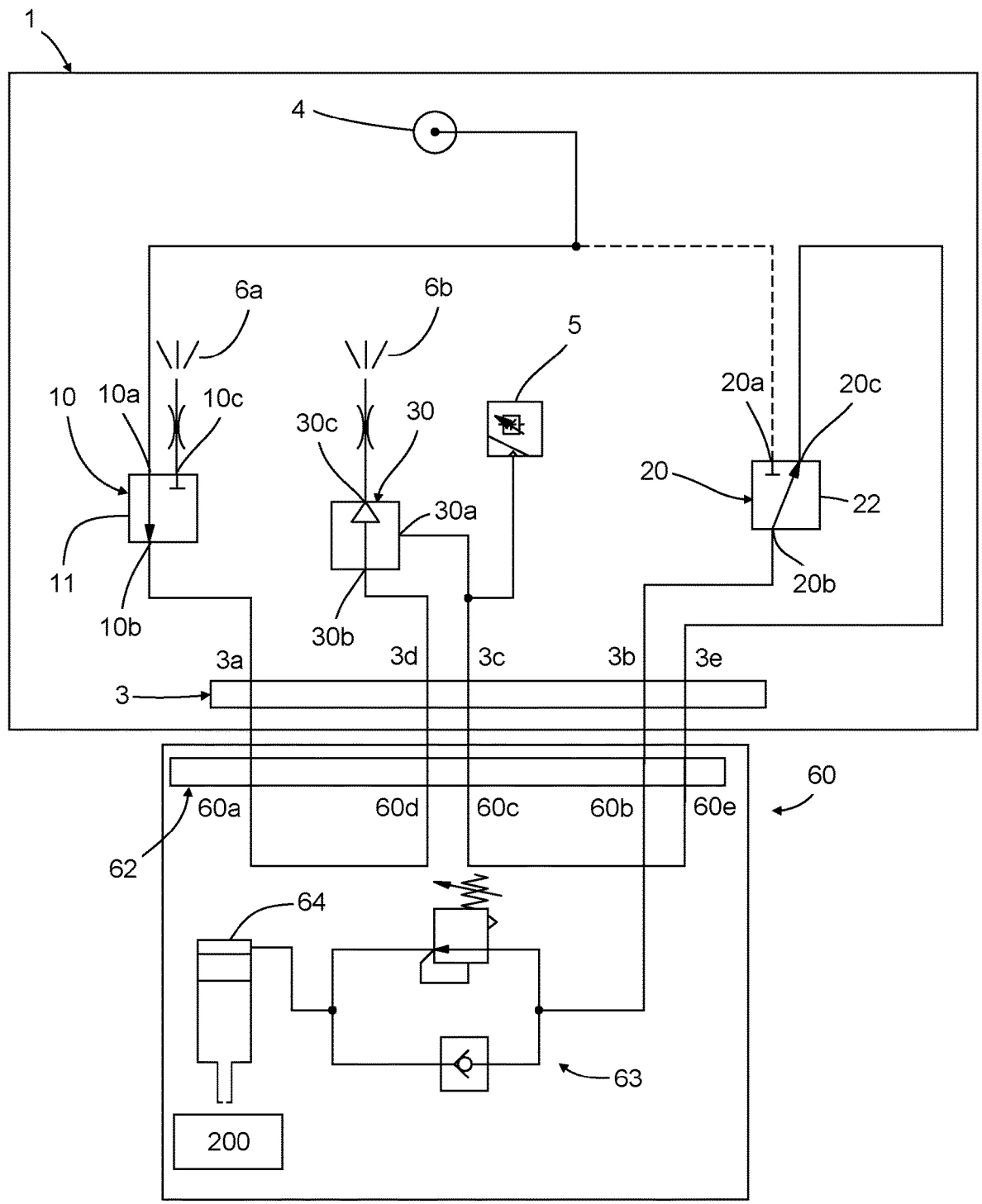
FIG. 10 is a pneumatic diagram of the robotic arm coupling of FIG. 5 with a mounted third tool in a first operating state.

FIG. 10 shows the pneumatic diagram of the robotic arm coupling 1 from FIG. 5 with a mounted third tool 60. The two valves 10 and 20 may be in the first operating state 11 and 22 to perform a suction actuation of the dispensing actuator 63 of the third tool 60 so that a dispensing may be terminated. This may allow pneumatic fluid to flow from the fluid inlet port 4 to first interface fluid port 3a via the pressure valve port 10a and the utilization valve port 10b of the first valve 10. The pneumatic fluid flow may continue to the fourth interface fluid port 3d via the fluid connection between the first tool valve port 50a and the fourth tool valve port 50d in the third tool 60. The pneumatic fluid flow may enter the suction device 30, here in the form of a vacuum ejector, through the pressure port 30b of the suction device 30. The pneumatic fluid may be ejected through a second fluid outlet 6b via the outlet port 30c of the suction device 30. The suction device 30, by ejecting the pneumatic fluid, may create a suction pressure at the suction port 30a of the suction device 30. This suction pressure may draw fluid from the dispensing actuator via the connection between the third interface fluid port 3c, the third tool interface fluid port 60c, the fifth tool interface fluid port 60e, the fifth interface fluid port 3e, the outlet valve port 20c of the second valve 20, the utilization valve port 20b of the second valve 20, the fourth interface fluid port 3d, the fourth tool interface fluid port 60d, and finally the dispensing actuator 63. The suction pressure may be regulated by the pressure regulator before being applied to a piston (not shown) of the dispenser 64. The third tool 60 further may include an end travel sensor (not shown) which may provide an actuation status signal to the status detection device 5 if the piston of the dispenser 64 has reached the end of travel thereby detecting if the dispenser 64 is empty.

Figure 11:
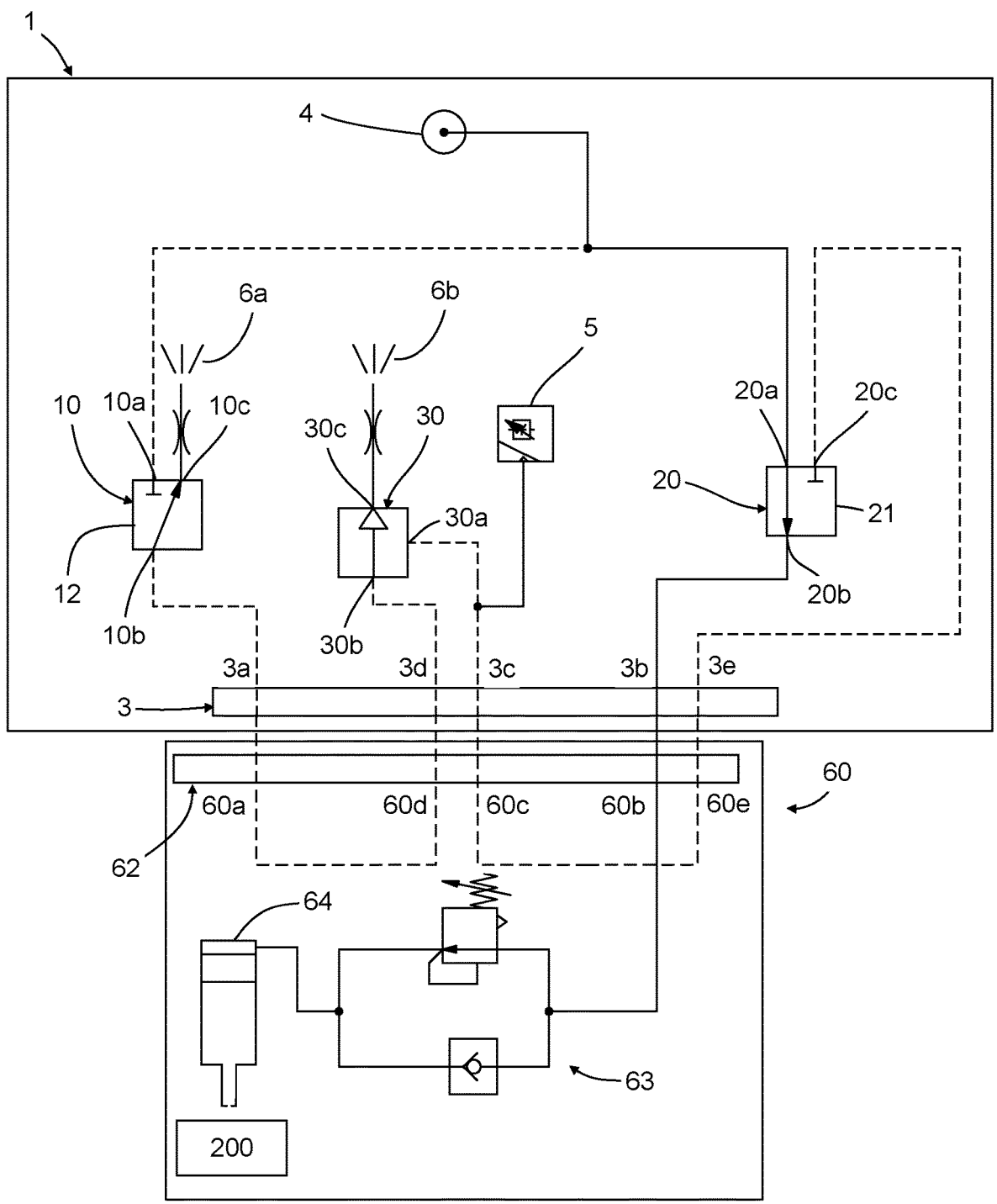
FIG. 11 is a pneumatic diagram of the robotic arm coupling of FIG. 5 with a mounted third tool in a second operating state.

FIG. 11 shows the pneumatic diagram of the robotic arm coupling 1 from FIG. 5 with a mounted third tool 60. The two valves 10 and 20 may be in the second operating state 12 and 21 to perform a dispensing actuation of a dispensing actuator 63 of the third tool 60 so that the liquid contained in the dispenser 64 may be dispensed on the object 200. The setting of the valves 10 and 20 may allow pneumatic fluid to flow from the fluid inlet port 4 to second interface fluid port 3b via the pressure valve port 20a and the utilization valve port 20b of the second valve 20. The pneumatic fluid may continue through the second tool interface port 60b to the dispensing actuator 63, which regulates the pressure of the pneumatic fluid by a pressure regulator to a gauge pressure suited for actuation of the dispenser 64, for instance about 0.5 bar. The pneumatic fluid may then apply pressure to a piston of the dispenser 64 to dispense the liquid contained therein.

Various embodiments of the disclosure may have one or more of the following effects.

In some embodiments, the disclosure may be based on the notion that while tools require different valves used to control, one type of tool may be rerouted and used to control a different type of tool.

In other embodiments, the disclosure provides a robotic arm coupling for connecting a tool with a robotic arm. The robotic arm may include the following components.

A mounting interface for mounting the robotic arm coupling on a robotic arm.

A coupler interface on which differently actuated tools may be releasably and interchangeably coupled.

A fluid inlet port which may be connected to an external or separately provided fluid source to receive a pneumatic fluid.

At least a first, a second, a third and a fourth interface fluid port provided separately or in association with the coupler interface.

At least one valve in fluid communication with the fluid inlet port and settable to at least a first and a second operating state. In the first operating state, the at least one valve allows fluid communication between the fluid inlet port and the first interface fluid port, and in the second operating state, between the fluid inlet port and the second interface fluid port.

A suction device for applying a fluid suction pressure to the third interface fluid port when a fluid pressure may be provided to the suction device via the fourth interface fluid port. The suction device may be a vacuum ejector.

When a first tool is mounted on the coupler interface, the first tool may establish a fluid connection between the first and the second interface fluid port to actuate a pneumatically actuated gripper of the first tool. Alternately, the first tool may establish a fluid connection between the first interface fluid port and a pneumatically actuated gripper of the first tool and between the second interface fluid port and the pneumatically actuated gripper of the first tool to actuate the pneumatically actuated gripper of the first tool. The first operating state may provide gripping actuation of the pneumatically actuated gripper and the second operating state may provide release actuation of the pneumatically actuated gripper.

When a second tool is mounted on the coupler interface, the second tool may establish a fluid connection between the second interface fluid port, the third interface fluid port, and a suction-actuated gripper of the second tool, and a fluid connection between the first interface fluid port and the fourth interface fluid port. The first operating state may provide suction actuation of the suction-actuated gripper and the second operating state may provide release actuation of the suction-actuated gripper.

When a third tool is mounted on the coupler interface, the third tool may establish a fluid connection between the second interface fluid port and a dispensing actuator of the third tool and the second operating state. An operating state may provide a dispensing actuation of the dispensing actuator, potentially to dispense a liquid.

Here, one and the same coupling may be applied to interchange between the three differently actuated tools. The at least two operating states of the at least one valve may provide different actuation depending on which tool is mounted. Thus, the at least two operating states of the at least one valve may be the same independently of which one of the first and second tools is used, and the type of actuation applied by the at least one valve to the tool may be applied by providing suitably positioned inlets and outlets on a corresponding mounting interface of the respective tools. Reusing valves for controlling various types of tools may reduce the overall weight of the coupling. This may help to enable a more versatile robotic arm which may perform additional tasks with greater weight capacity.

The liquid dispensed by the dispensing actuator may be an adhesive, a glue, a two-component adhesive, a sealant, a heat transfer paste, EMC shielding (conductive glue/sealant), a lubricant, lubrication grease, paint, masking paint, et cetera.

Optionally, the at least one valve may include at least a first and a second valve. The first valve, in the first operating state, may allow fluid communication between the fluid inlet port and the first interface fluid port and, and in the second operating state, may allow fluid communication between the first interface fluid port and a fluid outlet port, the fluid outlet port may be a first fluid outlet. The second valve, in the first operating state, may block fluid communication between the fluid inlet port and the first interface fluid port, and, and in the second operating state, may block fluid communication between the fluid inlet port and the second interface fluid port. The second valve may, in the second operating state, allow fluid communication between the second interface fluid port and a fluid outlet port which may be different from the first fluid outlet.

A second valve may reduce the complexity required of the first valve. A second valve may also allow the two valves to have a third operating state, by only having valves with two valve states each. A second valve may be cheaper and may also be more compact that using one valve.

Optionally, the robotic arm coupling may include a fifth interface fluid port. The second valve, in the first operating state, may allow fluid communication between the second interface fluid port and the fifth interface fluid port. When a first tool is mounted on the coupler interface, the first tool may establish a fluid connection between the fifth interface fluid port and a fluid outlet. When a second tool is mounted on the coupler interface, the fifth interface fluid port is blocked. When a third tool is mounted on the coupler interface, the third tool may establish a fluid connection between the first interface fluid port and the fourth interface fluid port, and a fluid connection between the third interface fluid port and the fifth interface fluid port, the first operating state may provide suction actuation of the dispensing actuator to prevent dispensing a liquid, and the second operating state may provide dispensing actuation of the dispensing actuator.

A fifth interface fluid port may allow switching between a fluid outlet port and a blocked port depending on the type of mounted tool. This may allow suction actuation of the suction-actuated gripper to have a single inlet which may increase the effectiveness of the suction-actuated gripper and may prevent bleeding pneumatic fluid.

Optionally, the robotic arm coupling may include an electronic interface for connection to a controller for setting the valve between the operating states. The interface may be connected to the at least one valve. The controller may be included as part or a member of, potentially being positioned within a housing of, the coupling. The controller may be able to detect if any one of a first or a second tool is mounted. This may be achieved by two switches connected to the electronic interface and located on the coupler interface, where the switches are activated respectively by a mounting either a first or a second tool.

The controller may be provided for controlling the operating states of the valve. The controller may be settable to control actuation and release of either of the different tools depending on which tool is mounted on the coupling. This may allow the controller to control the setting of the operating states of the at least one valve, and may have the advantage that the use of the robotic arm coupling may be eased.

Optionally, the robotic arm coupling may include an electronic interface for connection to a controller for setting the valve between the operating states. The interface may be connected to the at least one valve and may have an input being able to receive a gripping actuation signal and a releasing actuation signal from a robotic arm and which is able to transmit the gripping actuation signal and the releasing actuation signal to the controller.

When a robotic arm is connected to the electronic interface and when a first, a second, or a third tool is mounted on the coupler interface, the input may receive the actuation signal from the robotic arm and transmit it to the controller configured to set the operating states of the at least one valve to provide the gripping actuation of the pneumatically actuated gripper of the first tool, the gripping actuation of the suction-actuated gripper of the second tool, or the dispensing actuation of the dispensing actuator of the third tool upon receiving the gripping actuation signal. The controller may be configured to set the operating states of the at least one valve to provide the releasing actuation of the pneumatically actuated gripper of the first tool, the releasing actuation of the suction-actuated gripper of the second tool, or the suction actuation of the dispensing actuator of the third tool upon receiving the releasing actuation signal.

This may provide the advantage that the use of the robotic arm coupling may be further eased as the only signal required to operate the robotic arm coupling with a mounted tool may be a gripping actuation signal and a releasing actuation signal independent on the type of tool which is mounted, and as such a separate control for each tool may not be required.

Optionally, the electronic interface may include an output. The controller may include status detection device which may provide a first actuation status signal, for instance a successful actuation status signal, and a second actuation status signal, for instance a failed actuation status signal, to the output.

When a robotic arm is connected to the electronic interface, and when a first, a second, or a third tool is mounted on the coupler interface and has performed an actuation, the status detection device may detect if the gripping or releasing actuation has been successful or has failed, if the actuation has been successful, provide a first actuation status signal, and if the actuation has failed, provide a second actuation status signal.

This may be achieved by providing the status detection device with a camera which detects if an object is gripped or released, a limit switch located on the tool which detects if an object is gripped, or a pressure sensor.

This may provide the advantage that feedback may be provided to the robotic arm which may increase the reliability of the tool. If an actuation fails, the robotic arm coupling may transmit the actuation status signal such the robotic arm may provide a solution or that an operator is made aware.

The status detection device may include a pressure sensor which may be able to detect a fluid suction pressure of the suction device by being in fluid communication with the third interface fluid port. The pressure sensor may be connected to the electronic interface. The pressure sensor may be connected to the controller via the electronic interface. The controller may be able to detect if an actuation of the second tool, such as a suction gripping actuation or a releasing actuation, has been performed by means of the pressure sensor. This may, for instance, be achieved by detecting whether a low pressure is sustained after the suction-actuated gripper has performed a gripping actuation, and by detecting whether an ambient pressure is reached after the suction-actuated gripper has performed a releasing actuation.

This may provide the advantage that a pressure sensor may be a reliable and cheap way to provide the actuation status signal.

The third tool may include a sensor configured to transmit, when the third tool is mounted on the robotic arm coupling, a second actuation signal to the status detection device when the dispenser has dispensed an amount of liquid, for instance when the dispenser has dispensed 50% of the liquid, 75% of the liquid, or 100% of the liquid.

Optionally, the at least one valve may include at least a first and a second valve each having at least three valve ports. The at least three valve ports may include a pressure, a utilization, and an outlet valve port, the pressure valve port being in fluid communication with the fluid inlet port. The suction device may have a suction port, a pressure port, and an outlet port. The suction device may apply a fluid suction pressure via the suction port to the third interface fluid port and fluid flow through the outlet port when a fluid pressure is provided to the suction device through the pressure port via the fourth interface fluid port.

In the first operating state, the first valve may allow fluid communication between the pressure valve port and the utilization valve port and the second valve allows fluid communication between the utilization valve port and the outlet valve port.

In the second operating state, the first valve may allow fluid communication between the utilization and the outlet valve port and the second valve allows fluid communication between the pressure and the utilization valve port.

The pressure valve port of the second valve may be able to receive fluid from the same fluid source as the pressure port of the first valve.

Providing the valves with at least three ports may provide the advantage that these types of valves may be simple, compact, cheap, and reliable.

Optionally, the at least one valve may be settable to a third operating state. The at least one valve may block fluid communication between the fluid inlet port and any of the interface fluid ports. This may provide the advantage that the robotic coupling does not bleed pneumatic fluid and thus may reduce the operating cost of robotic arm coupling.

Optionally, a set of parts may include the following components.

A robotic arm coupling.

At least one tool, two different tools, or three different tools selected from the group consisting of the following components.

A first tool which, when mounted on the robotic arm coupling, may establish a fluid connection between the first and second interface fluid port to actuate a pneumatically actuated gripper of the first tool.

A second tool which, when mounted on the robotic arm coupling, may establish a fluid connection between the second interface fluid port, the third interface fluid ports, and a suction-actuated gripper of the second tool and a fluid connection between the first interface fluid port and the fourth interface fluid port. Alternately, the suction device of the robotic arm coupling, may instead form part of the second tool. In this case, the robotic arm coupling may include at least the first and the second fluid interface ports.

A third tool which, when mounted on the robotic arm coupling, may establish a fluid connection between the second interface fluid port and a dispensing actuator of the second tool, a fluid connection between the first interface fluid port and the fourth interface fluid port, or a fluid connection between the third interface fluid port and the fifth interface fluid port.

Each of the first and the second tools may have interface fluid ports corresponding to the associated interface fluid ports of the robotic arm coupling to enable actuation depending on the selected tool. The set of parts may include a robotic arm for performing a task, in particular a pick and place task. The robotic arm coupling may be mounted on the robotic arm. The robotic arm coupling may include a controller which may be connected to the robotic arm, such that the robotic arm may control a tool mounted on the robotic arm coupling by providing an actuation signal. This may provide the advantage that a flexible and versatile set of parts may be provided where a first, a second, and/or a third tool is easily interchanged to allow the robotic arm to perform tasks requiring different tools.

Optionally, the at least one valve may be at least one solenoid valve with at least two or three different states. The at least one valve may be controllable by a controller.

Optionally, the robotic arm coupling may include at least two valves. The at least two valves may be solenoid valves each having with at least two different states, such as an activated and a deactivated state. The at least two valves may be controllable by a controller, optionally an electrical controller.

Solenoid valves may provide the advantage that they are cheap, reliable, and easy to use. When a solenoid valve is controllable by a controller they may be also readily implementable in a control scheme.

Optionally, the robotic arm coupling may include a housing. The housing may include the at least one valve, the suction device, a controller, and/or a pressure sensor.

The at least one valve, the suction device, the controller, and/or the pressure sensor may be disposed inside the housing, optionally in a spacing inside the housing. The mounting interface may be a part of the housing or be mounted on the housing. This may provide the advantage of a simple and easy to use robotic arm coupling, which may be self-contained and may protect the elements of the coupling. The at least one valve may alternately be mounted on the outside of the housing of the robotic arm coupling, which may ease the assembly of the robotic arm coupling.

Optionally, the robotic arm coupling may be included in a base. The base may include at least one or a plurality of robotic arm couplings, for instance two robotic arm couplings. The robotic arm couplings may be according to any of the above embodiments. The base may include, instead of the at least one robotic arm coupling, a mounting interface for mounting the base on a robotic arm. The base may include a fluid inlet port which may form a fluid connection to the at least one valve of each of the one or plurality of robotic arm couplings. The base may include a fluid inlet port for each of the robotic arm couplings.

The base may provide the advantage that more robotic arm couplings may be included in the base, which may allow the base, in connection with a robotic arm, to perform tasks of moving an object a location and removing another object from the same location, for instance in electronics manufacturing.

In other embodiments, the disclosure provides a method of exchanging a tool type. The method may include the following steps: (1) providing a robotic arm coupling; and (2) connecting any one of a first, second, and a third tool to the robotic arm coupling through the coupler interface of the robotic arm coupling, so that the respective tool is controllable by the at least one valve of the robotic arm coupling.

This method may provide the advantage that a tool may be exchanged with another tool without any additional configuration or setup, which may allow for a more flexible robotic arm coupling.

In other embodiments, the disclosure may relate to the use of a robotic arm coupling in combination with a robotic arm for a moving task, in particular a pick-and-place task.

In some embodiments, pneumatic fluid may be pressurized air. This may provide the advantage that air may be readily available and non-toxic. Alternately, pneumatic fluid may be pressurized air with a raised nitrogen content. This may be an advantage in fire hazardous environments. It may be patentably desirable to use pneumatics. However, it is contemplated that hydraulics may be used additionally or alternately.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A robotic arm coupling for connecting a tool with a robotic arm, comprising:
    a mounting interface for mounting the robotic arm coupling on a robotic arm;
    a coupler interface configured to releasably and interchangeably couple differently actuated tools;
    a fluid inlet port connected to an external fluid source to receive a pneumatic fluid;
    a first fluid port provided with the coupler interface;
    a second fluid port provided with the coupler interface;
    a third fluid port provided with the coupler interface;
    a fourth fluid port provided with the coupler interface;
    at least one valve in fluid communication with the fluid inlet port and configured to be set to a first operating state and a second operating state, where
        in the first operating state, the at least one valve allows a fluid communication between the fluid inlet port and the first fluid port, and
        in the second operating state, the at least one valve allows a fluid communication between the fluid inlet port and the second fluid port; and
    a suction device configured to apply a fluid suction pressure to the third fluid port when a fluid pressure is provided to the suction device via the fourth fluid port;
    wherein:
        a first tool is configured to mount on the coupler interface to establish a fluid connection between the first fluid port and the second fluid port to actuate a pneumatically actuated gripper of the first tool, where the first operating state provides a gripping actuation of the pneumatically actuated gripper and the second operating state provides a release actuation of the pneumatically actuated gripper;
        a second tool is configured to mount on the coupler interface to establish a fluid connection between the second fluid port, the third fluid port, and a suction-actuated gripper of the second tool, and further establish a fluid connection between the first fluid port and the fourth fluid port, where the first operating state provides a suction actuation of the suction-actuated gripper and the second operating state provides a release actuation of the suction-actuated gripper; and
        a third tool is configured to mount on the coupler interface to establish a fluid connection between the second fluid port and a dispensing actuator of the third tool, where the second operating state provides a dispensing actuation of the dispensing actuator.

2. The robotic arm coupling of claim 1, wherein:
    the at least one valve comprises a first valve and a second valve;
    the first valve allows a fluid communication between the fluid inlet port and the first fluid port in the first operating state, and allows fluid a communication between the first fluid port and a fluid outlet in the second operating state; and
    the second valve does not allow a fluid communication between the fluid inlet port and the first fluid port in the first operating state, and does not allow a fluid communication between the fluid inlet port and the second fluid port in the second operating state.

3. The robotic arm coupling of claim 2, wherein:
    the robotic arm coupling comprises a fifth fluid port;
    the second valve allows a fluid communication between the second fluid port and the fifth fluid port in the first operating state;
    the first tool is configured to mount on the coupler interface to establish a fluid connection between the fifth fluid port and a fluid outlet;
    the second tool is configured to mount on the coupler interface to block the fifth fluid port; and/or
    the third tool is configured to mounted on the coupler interface to establish a fluid connection between the first fluid port and the fourth fluid port, and further establish a fluid connection between the third fluid port and the fifth fluid port, where the first operating state provides a suction actuation of the dispensing actuator to prevent dispensing a liquid and the second operating stateprovides dispensing actuation of the dispensing actuator.

4. The robotic arm coupling of claim 1, wherein:
    the robotic arm coupling comprises an electronic interface connected to a controller for setting the valve between the operating states; and
    the electronic interface is connected to the at least one valve and has an input configured to receive a gripping actuation signal and a releasing actuation signal from a robotic arm, and further configured to transmit the gripping actuation signal and the releasing actuation signal to the controller;
    so that when a robotic arm is connected to the electronic interface and when a first, a second, or a third tool is mounted on the coupler interface,
        the input is configured to receive the actuation signal from the robotic arm and transmit it to the controller configured to set the operating states of the at least one valve to provide the gripping actuation of the pneumatically actuated gripper of the first tool, the gripping actuation of the suction-actuated gripper of the second tool, or the dispensing actuation of the dispensing actuator of the third tool upon receiving the gripping actuation signal, and the input is further configured to set the operating states of the at least one valve to provide the releasing actuation of the pneumatically actuated gripper of the first tool, the releasing actuation of the suction-actuated gripper of the second tool, or the suction actuation of the dispensing actuator of the third tool upon receiving the releasing actuation signal.

5. The robotic arm coupling of claim 4, wherein:

the electronic interface comprises an output; and the controller comprises a status detection device configured to provide a first actuation status signal such as a successful actuation status signal and a second actuation status signal such as a failed actuation status signal, to said to the output;

so that when a robotic arm is connected to the electronic interface and when a first, a second, or a third tool is mounted on the coupler interface and has performed an actuation, the status detection device is configured to detect if the actuation has succeeded or failed, if succeeded, the status detection device provides a first actuation status signal, and if failed, the status detection device provides a second different actuation status signal.

6. The robotic arm coupling of claim 5, wherein the status detection device comprises a pressure sensor configured to detect a fluid suction pressure of the suction device by being in fluid communication with the third fluid port.

7. The robotic arm coupling of claim 1, wherein-:

the at least one valve comprises a first valve and a second valve each having three valve ports; a pressure valve port, a utilization vale port, and an outlet valve port, where the pressure valve port is in a fluid communication with the fluid inlet port;

the suction device has a suction port, a pressure port, and an outlet port, where the suction device applies a fluid suction pressure via the suction port to the third fluid port, and a flow through the outlet port when a fluid pressure is provided to the suction device through the pressure port via the fourth fluid port;

the first valve allows a fluid communication between the pressure valve port and the utilization valve port, and the second valve allows fluid communication between the utilization valve port and the outlet valve port in the first operating state; and the first valve allows a fluid communication between the utilization valve port and the outlet valve port, and the second valve allows a fluid communication between the pressure valve port and the utilization valve port in the second operating state.

8. The robotic arm coupling of claim 1, wherein:

the at least one valve is configured to be set to a third operating state; and the at least one valve shuts all fluid communications between the fluid inlet port and the first fluid port, the second fluid port, the third fluid port, and the fourth fluid port.

9. A robotic arm system, comprising:

a robotic arm coupling according to claim 1; and a tool selected from the group consisting of:

a first configured to mount on the robotic arm coupling to establish a fluid connection between the first fluid port and second fluid port to actuate a pneumatically actuated gripper of the first tool;

a second tool configured to mount on the robotic arm coupling to establish a fluid connection between the second fluid port, the third fluid port, and a suction-actuated gripper of the second tool, and further establish a fluid connection between the first fluid port and the fourth fluid port; and third tool configured to mount on the robotic arm coupling to establish a fluid connection between the second fluid port and a dispensing actuator of the second tool.

10. A method of connecting a tool to a robotic arm coupling comprising the steps of:

providing a robotic arm coupling in claim 1, connecting any one of a first, second, and a third tool to the robotic arm coupling through the coupler interface of the robotic arm coupling, so that the respective tool is controllable by the at least one valve of the robotic arm coupling.

* * * * *